(12) United States Patent
Imazu et al.

(10) Patent No.: US 7,733,674 B2
(45) Date of Patent: Jun. 8, 2010

(54) POWER CONVERSION APPARATUS FOR CONVERTING DIRECT CURRENT TO POLYPHASE ALTERNATING CURRENT

(75) Inventors: Tomoya Imazu, Yokohama (JP); Yukio Mizukoshi, Machida (JP); Yuki Nakajima, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 245 days.

(21) Appl. No.: 11/873,637

(22) Filed: Oct. 17, 2007

(65) Prior Publication Data

US 2008/0117657 A1 May 22, 2008

(30) Foreign Application Priority Data

| Nov. 22, 2006 | (JP) | ............... 2006-315741 |
| Oct. 10, 2007 | (JP) | ............... 2007-264036 |

(51) Int. Cl.
*H02M 1/12* (2006.01)
(52) U.S. Cl. ............... 363/41; 363/71; 363/97
(58) Field of Classification Search ............ 363/39–41, 363/71, 95, 97, 98, 131, 132
See application file for complete search history.

(56) References Cited

U.S. PATENT DOCUMENTS

| 3,875,496 | A | * | 4/1975 | Carsten ..................... 363/97 |
| 5,068,777 | A | * | 11/1991 | Ito ........................... 363/97 |
| 5,412,558 | A | * | 5/1995 | Sakurai et al. ............... 363/98 |
| 5,615,099 | A | * | 3/1997 | Nakazawa .................. 363/98 |
| 5,801,936 | A | * | 9/1998 | Mori et al. .................. 363/132 |
| 5,831,843 | A | * | 11/1998 | Lindberg et al. ............. 363/41 |
| 6,101,109 | A | * | 8/2000 | Duba et al. .................. 363/71 |
| 6,590,312 | B1 | * | 7/2003 | Seguchi et al. ............. 310/266 |
| 6,751,105 | B2 | * | 6/2004 | Yamanaka et al. ............ 363/41 |
| 6,870,347 | B2 | * | 3/2005 | Mizuno et al. ............. 318/722 |
| 7,049,778 | B2 | * | 5/2006 | Katanaya .................... 363/41 |
| 7,548,439 | B2 | * | 6/2009 | Meguro et al. ............... 363/41 |

FOREIGN PATENT DOCUMENTS

| JP | H05-056653 | 3/1993 |
| JP | 2000-078850 | 3/2000 |
| JP | 2004-159454 | 6/2004 |

* cited by examiner

*Primary Examiner*—Jeffrey L Sterrett
*Assistant Examiner*—Fred E Finch, III
(74) *Attorney, Agent, or Firm*—Global IP Counselors, LLP (57) ABSTRACT

A power conversion apparatus for converting direct current from a power source to polyphase alternating current includes a plurality of carrier signal generators, a plurality of gate signal generators, and a plurality of legs. The carrier signal generators are configured and arranged to independently generate and transmit a plurality of carrier signals, respectively. The gate signal generators are operatively coupled to the carrier signal generators, respectively, to receive the carrier signals, each of the gate signal generators being configured and arranged to generate an on/off signal by comparing a command value of each phase of the polyphase alternating current and corresponding one of the carrier signals. The legs are connected to the gate signal generators. Each of the legs is operated based on the on/off signal transmitted from corresponding one of the gate signal generators to convert the direct current to each phase of the polyphase alternating current.

12 Claims, 7 Drawing Sheets

POWER CONVERSION APPARATUS FOR CONVERTING DIRECT CURRENT TO POLYPHASE ALTERNATING CURRENT

CROSS-REFERENCE TO RELATED APPLICATIONS

This application claims priority to Japanese Patent Application No. 2006-315741, filed on Nov. 22, 2006 and Japanese Patent Application No. 2007-264036, filed on Oct. 10, 2007. The entire disclosure of Japanese Patent Application No. 2006-315741 and 2007-264036 are hereby incorporated herein by reference.

BACKGROUND OF THE INVENTION

1. Field of the Invention

The present invention relates to a power conversion apparatus. More specifically, the present invention relates to the power conversion apparatus for generating on/off signals using pulse width modulation (PWM).

2. Background Information

Several types of voltage-type inverters used to drive alternating current motors are currently known. In these inverters, three of single-phase half-bridge circuits are connected in parallel with each of the single-phase half-bridge circuits having two electrical switches connected in series, and the on/off signals of the switches are generated by pulse width modulation (PWM). When the switches are switched on and off, a ripple current will be generated according to the frequency of the PWM modulating signal (the carrier) and according to the motor inductance. Thus, a smoothing capacitor inserted into the circuit to smooth out the ripple current.

Japanese Laid-Open Patent Application Publication No. 2000-78850 discloses one example of an inverter device and a method for controlling the inverter device that reduces the ripple current and the capacity of the smoothing capacitor. In the inverter device disclosed in this reference, two inverters shares a common smoothing capacitor. Moreover, countermeasures are adopted such as synchronizing the carriers of each inverter, switching the peaks and troughs (valleys) of the triangular waves of the inverters used for modulation, and synchronizing the on state of one with the off state of the other. As a result, the ripple currents flow alternately into the smoothing capacitor to cancel each other.

Moreover, Japanese Laid-Open Patent Application Publication No. 05-56653 discloses another example of an inverter apparatus in which a converter is placed between an alternating current source and a direct current bus, and an inverter is placed between the direct current bus and the alternating current load. In the inverter apparatus disclosed in this reference, the two modulation signals are synchronized, and the flow of current into a smoothing capacitor attached to the direct current bus is reduced. Thus, the inverter apparatus disclosed in this reference performs synchronization control of two power conversion devices (the converter and the inverter) that are connected to the shared smoothing capacitor.

In view of the above, it will be apparent to those skilled in the art from this disclosure that there exists a need for an improved power conversion system. This invention addresses this need in the art as well as other needs, which will become apparent to those skilled in the art from this disclosure.

SUMMARY OF THE INVENTION

Since in the inverter apparatus disclosed in the above references the modulation signals between different inverters are synchronized, or a modulation signal is obtained through a shared modulation signal, complications arise when larger numbers of inverters and switch arms are connected to the shared smoothing capacitor. Moreover, in order to synchronize the modulation signals of the inverters, synchronization signals must be sent back and forth between each inverter, and a high communication rate must be achieved to synchronize the high carrier wave frequencies determined by the operational rate of the switching elements. Thus, system costs increase as a result. Additionally, the system is sensitive to switching noise, and thus, care must be taken to ensure high-quality communication is performed, which also leads to increases cost. Furthermore, as the number of inverters or legs increases for modulation signals that must be synchronized, the costs associated with the synchronization increase exponentially.

Accordingly, one object of the present invention is to provide a power conversion apparatus that does not increase system cost even when the number of inverters or switching arms is increased.

In order to achieve the above object of the present invention, a power conversion apparatus for converting direct current from a power source to polyphase alternating current includes a plurality of carrier signal generators, a plurality of gate signal generators, and a plurality of legs. The carrier signal generators are configured and arranged to independently generate and transmit a plurality of carrier signals, respectively. The gate signal generators are operatively coupled to the carrier signal generators, respectively, to receive the carrier signals, each of the gate signal generators being configured and arranged to generate an on/off signal by comparing a command value of each phase of the polyphase alternating current and corresponding one of the carrier signals. The legs are connected to the gate signal generators. Each of the legs is operated based on the on/off signal transmitted from corresponding one of the gate signal generators to convert the direct current to each phase of the polyphase alternating current.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
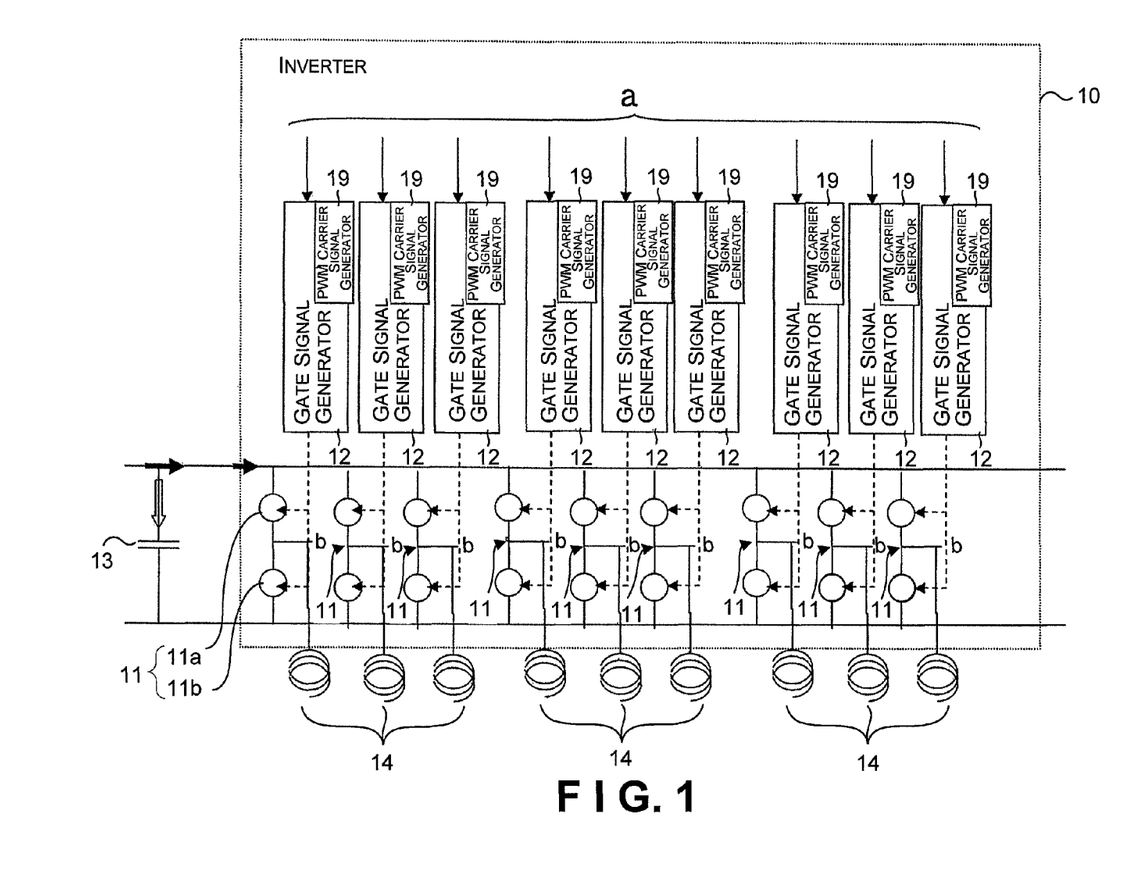
FIG. 1 is a schematic diagram of a power conversion apparatus in accordance with a first embodiment of the present invention.

Referring initially to FIG. 1, a power conversion apparatus is illustrated in accordance with a first embodiment of the present invention. In the first embodiment of the present invention, the power conversion apparatus is arranged as an inverter 10. FIG. 1 is a schematic diagram of the inverter 10 in accordance with the first embodiment of the present invention. As shown in FIG. 1, the inverter 10 is preferably a multi-leg inverter apparatus, which is provided with a plurality of legs 11. Each of the legs 11 is formed as a series switching circuit having a pair of bidirectional switches (semiconductor switches) 11a and 11b connected in series. In the first embodiment of the present invention, the inverter 10 also includes a plurality of gate signal generators (variable gate signal generators) 12 respectively connected to the legs 11. The input side of the inverter 10 is connected to a direct current power source (not shown) via a smoothing capacitor 13 (shown in FIG. 2), and the output side of the inverter 10 is connected to phase windings (phase coils) 14 corresponding to each phase of a polyphase alternating current motor 16 (shown in FIGS. 2 and 3).

As shown in FIG. 1, in the first embodiment of the present invention, each of the gate signal generators 12 is independently provided with respect to each of the legs 11. Moreover, a PWM carrier signal generator 19 is provided to each of the gate signal generators 12. Each of the PWM carrier signal generators 19 is configured to output a PWM carrier signal to the corresponding gate signal generator 12.

The inverter 10 is operatively connected to an inverter control unit 40 (FIG. 3) that is configured to input generation voltage commands or current commands a (referred as "phase voltage command a") corresponding to the current command values for each phase of the polyphase alternating current motor 16 to the inverter 10. A comparator or the like (not shown) is used to compare the PWM carrier signal from the PWM carrier signal generator 19 with the corresponding phase voltage command a. As a result, a variable PWM gate signal b is generated and outputted from the gate signal generator 12. In the first embodiment of the present invention, the PWM carrier signal generators 19 are preferably configured and arranged to output the PWM carrier signals that have mutually different reference frequencies.

The connections of the ends of the phase windings 14 that are opposite from the ends connected to the legs 11 of the inverter 10 are not limited to any specific connection arrangement. For example, in FIG. 1, when the first through third windings 14 (winding loads) on the left side are connected, the connected phase windings 14 form the winding connection for driving a Y-connection three-phase motor. Similarly, the fourth through sixth windings 14 and the seventh through ninth windings 14 are respectively connected to form inverters for driving Y-connection three-phase motors. These nine windings 14 are inserted into motor slots to form three parallel drives for the three-phase motor 16.

A well-known inverter for driving a three-phase motor typically has three inverter legs, and the windings connected to the legs are connected in parallel. In other words, the inverter can be adapted to a multi-slot motor according to the number of parallel windings.

Figure 2:
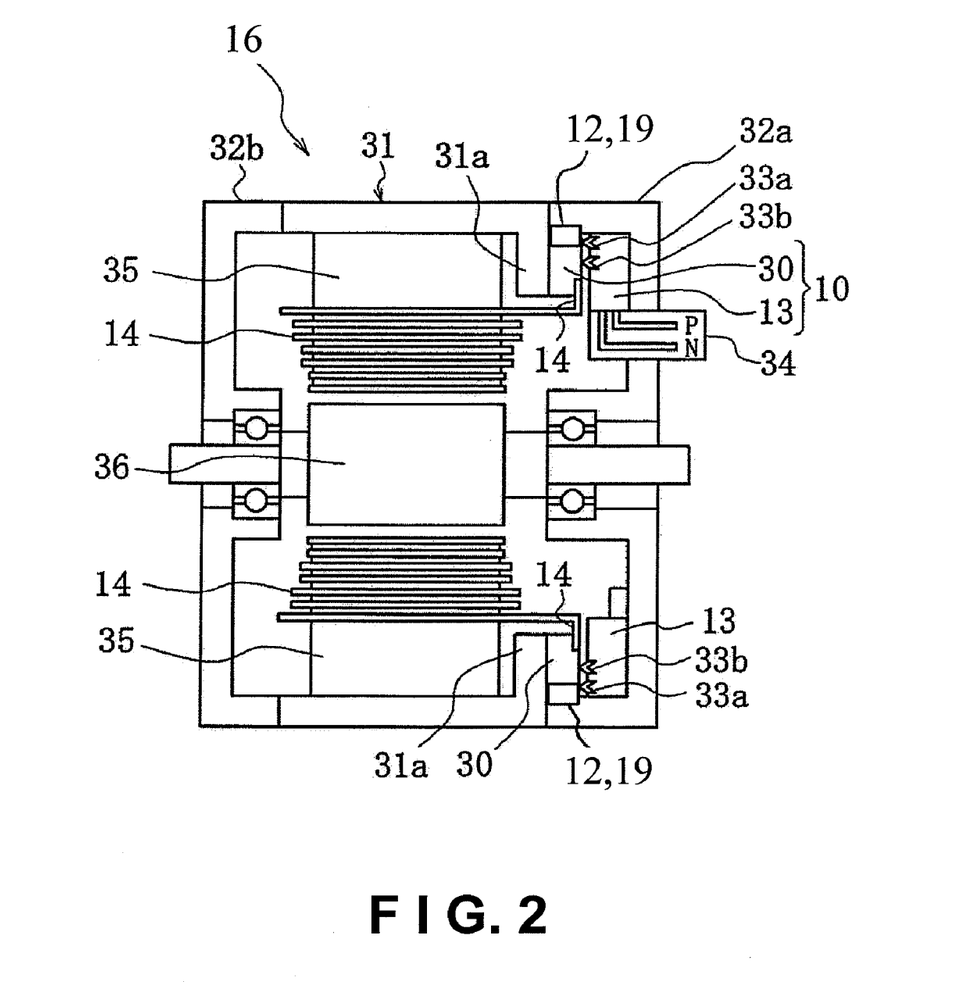
FIG. 2 is a simplified schematic cross-sectional view of a motor provided with the power conversion apparatus in accordance with the first embodiment of the present invention.

On the other hand, in the inverter 10 according to the first embodiment of the present invention, one leg 11 is provided to each of the windings 14. The inverter 10 of the first embodiment can be applied to the motor 16 that is an electro-mechanical motor equipped with the inverter 10, for example, as shown in FIG. 2. As shown in FIG. 2, the distance between the windings 14 and the legs 11 can be reduced by assigning the leg 11 to each winding 14. Therefore, loss in wiring can be reduced. Moreover, transit current for each of the legs 11 is dispersed, as compared to when the windings 14 are connected in parallel using one leg. Therefore, joule heat can be dispersed, and countermeasures required to manage heat generated in the legs 11 can be simplified.

As shown in the cross-sectional diagram of the motor 16 in FIG. 2, the inverter 10 is installed on the polyphase alternating current motor 16. The inverter 10 includes a plurality of switching elements 30 (corresponding to the legs 11) and a smoothing capacitor 13 configured and arranged to smooth the direct current supplied to the switching elements 30.

As shown in FIG. 2, the polyphase alternating current motor 16 has an external motor chassis formed from a cylindrical motor case 31, and a primary motor cover 32a and a secondary motor cover 32b that cover both axial openings of the motor case 31. The motor case 31 includes an inner-facing flange 31a formed at one of the axial openings to which the primary motor cover 32a is attached. The switching elements 30 are installed on the axial end surface of the inner-facing flange 31a. The switching elements 30 are circumferentially disposed in a plurality of locations upon the axial end surface of the inner-facing flange 31a, and each of the switching elements 30 is connected to the windings 14 of the polyphase alternating current motor 16. The switching operations (on/off operation) of the switching elements 30 are controlled by the gate signal generator 12. The motor 16 includes a stator 35 on which the windings 14 are wound in a concentrated-winding arrangement, and a rotor 36.

The smoothing capacitor 13 is anchored to the inner surface of the primary motor cover 32a, and disposed opposite the switching elements 30 in the axial direction. The smoothing capacitor 13 has a round disk shape so as to cover the switching elements 30. Two electrode terminals 33a and 33b protrude in a springing-loaded manner from one of the surfaces of the smoothing capacitor 13 (disk plane). The electrode terminals 33a and 33b are aligned with the positions of the P-pole and N-pole of an input pin 34 that is connected to a direct current (DC) power source.

The switching elements 30 of the inverter 10 are distributed in the circumferential direction, and electrodes of the switching elements 30 are exposed. The disk shaped smoothing capacitor 13 is disposed correspondingly with each switching element 30, and the electrode terminals 33a and 33b of the smoothing capacitor 13 are exposed and connected to the respective electrodes of the switching elements 30. The switching elements 30 are distributed along a circumference that is concentric with respect to the smoothing capacitor 13.

The polyphase alternating current motor 16 constructed as described above thus has few parts, which facilitates assembly. Also, the pins for the electrode terminals 33a and 33b of the smoothing capacitor 13 are connected directly with the switching element 30, allowing inductance to be reduced. The current balance in the polyphase alternating current motor 16 is also good because the distributed switching elements 30 can be connected to the smoothing capacitor 13 equidistantly. The smoothing capacitor 13 has exceptional heat dissipation properties because the smoothing capacitor 13 is fixed to the primary motor cover 32a. Moreover, the switching elements 30 are circumferentially dispersed, and the smoothing capacitors 13 are formed as a circular disk, whereby the space axially adjacent to the polyphase alternating current motor 16 can be advantageously used. This allows the inverter 10 to be made smaller, and the entirety of the polyphase alternating current motor 16 to be further reduced in size.

Figure 3:
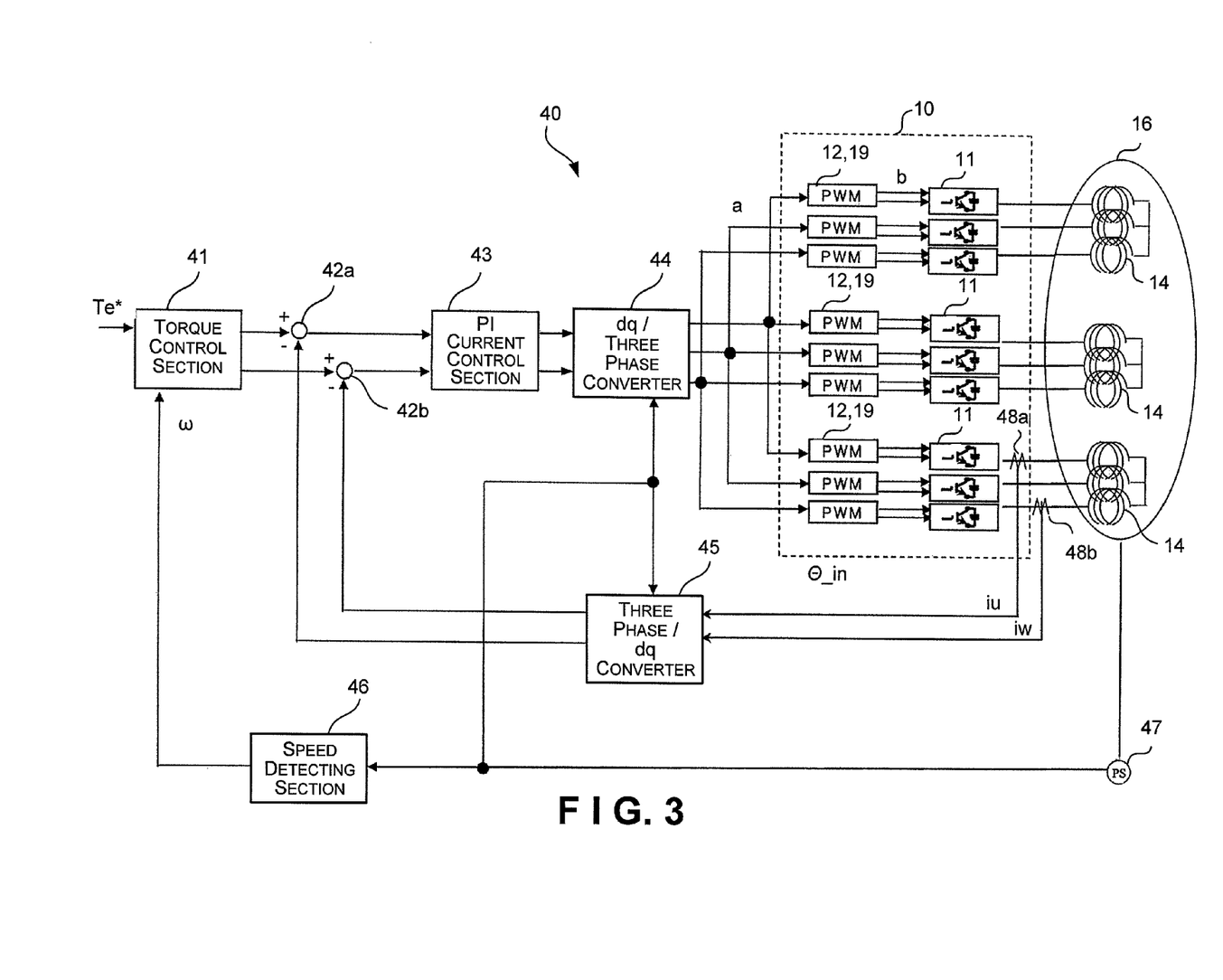
FIG. 3 is a block diagram of a control unit connected to the power conversion apparatus illustrated in FIG. 1 in accordance with the first embodiment of the present invention.

FIG. 3 is a block diagram of the inverter control unit 40 operatively coupled to the inverter 10 illustrated in FIG. 1. As shown in FIG. 3, the inverter control unit 40 includes a torque control section 41, a pair of subtractors 42a and 42b, a PI (proportion/integration) current control section 43, a dq/three-phase converter 44, a three-phase/dq converter 45, a speed detecting section 46, a rotational angle sensor (PS) 47, a U-phase current sensor 48a and a W-phase current sensor 48b.

The inverter control unit 40 preferably includes a microcomputer with a power conversion control program that controls the inverter 10 as discussed below. The inverter control unit 40 can also include other conventional components such as an input interface circuit, an output interface circuit, and storage devices such as a ROM (Read Only Memory) device and a RAM (Random Access Memory) device. The memory circuit stores processing results and control programs that are run by the processor circuit. The inverter control unit 40 is operatively coupled to the inverter 10 in a conventional manner. The internal RAM of the inverter control unit 40 stores statuses of operational flags and various control data. The internal ROM of the inverter control unit 40 stores the maps and data for various operations. The inverter control unit 40 is capable of selectively controlling any of the components of the control system in accordance with the control program. It will be apparent to those skilled in the art from this disclosure that the precise structure and algorithms for the inverter control unit 40 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The rotational angle sensor 47 is coupled to the three-phase alternating current motor 16, and information detected by the rotational angle sensor 47 is input to the dq/three-phase converter 44, the three-phase/dq converter 45, and the speed detecting section 46. The U-phase current sensor 48a is coupled to the U-phase output of the three-phase inverter 10, and the W-phase current sensor 48b is coupled to the W-phase output of the three-phase inverter 10. The U-phase current sensor 48a and the W-phase current sensor 48b are configured and arranged to detect detection phase current values (iu and iw), and output the detected values to the three-phase/dq converter 45.

The torque control section 41 is configured to receive a torque command value (Te*), and also configured to receive a rotational speed (ω) from the speed detecting section 46. Then, the torque control section 41 is configured to output torque control values to the subtractors 42a and 42b. The subtractors 42a and 42b are configured to subtract the output values of the three-phase/dq converter 45 from the torque control values outputted from the torque control section 41, and to output the results of the calculation to the PI current control section 43. The PI current control section 43 is configured to output the PI current control values to the dq/three-phase converter 44. The dq/three-phase converter 44 is configured to output the three-phase conversion information to the gate signal generators 12 as the phase voltage commands a.

Then, as described above, each of the gate signal generators 12 is configured to compare the phase voltage command a with the PWM carrier obtained from the PWM carrier signal generator 19, and to output an on/off signal of the corresponding switching element 30 to the corresponding leg 11.

As described above, the legs 11 in the multi-layer current inverter 10 according to the first embodiment of the present invention are controlled by the corresponding gate signal generator 12, and the legs 11 sharing the smoothing capacitor 13 (FIG. 2) is independently operated based on the corresponding PWM carrier signal outputted from the corresponding PWM carrier signal generator 19. In other words, each leg 11 sharing the smoothing capacitor 13, and associated with one of the phases in the polyphase alternating current motor 16 is provided with a set of the gate signal generator 12 and the PWM carrier signal generator 19.

Accordingly, with the first embodiment of the present invention, each of the legs 11 can be controlled independently without using a wide-area carrier signal generated from a common carrier signal sent to the legs 11. Moreover, each of the PWM carrier signal generators 19 is independent and no synchronization is performed therebetween. Therefore, designing a wide-area-oriented system for performing synchronization becomes unnecessary, and costs can be minimized. Noise is accordingly less likely to contaminate the on/off signals, and short circuiting is less likely to occur in the inverter legs 11.

In particular, an inverter is arranged such that several windings are driven respectively by using a plurality of legs with some of the legs being operated based on the same phase voltage command value a. Thus, the ripple currents generated by each of the legs will more readily be synchronized when the common carrier signal is used to compare and generate the on/off signals. The ripple currents are superimposed and increase, and the current flowing in and out of the smoothing capacitor inevitably increases.

However, in the first embodiment of the present invention, the PWM carrier signal generator 19 for outputting the PWM carrier signal is provided to each of the gate signal generators 12, and synchronization between the legs 11 is not performed. Therefore, the PWM carrier signals between each of the U-phase, V-phase, and W-phase have no correlation with one other, and thus, little risk is presented that the timing of the switch operation of the legs 11 will be synchronized, even when the same phase voltage command value a is input. Superimposition of the ripple currents can accordingly be circumvented.

Furthermore, in the first embodiment of the present invention, the PWM carrier signal generators 19 are preferably configured to output PWM carrier signals having mutually different frequencies. Thus, the reference frequency of the ripple current generated by each leg 11 of the inverter 10 becomes even more noncorrelated. Therefore, superimposition of the ripple currents is circumvented, the ripple currents cancel out one another, and the capacity of the shared smoothing capacitor 13 can be reduced.

Moreover, in the first embodiment of the present invention, the lowest frequency among those frequencies of the PWM carrier signals from the PWM carrier signal generators 19 are set above the range of audible sound (audible band). As a result, the capacity of the shared smoothing capacitor 13 can be reduced due to the ripple currents canceling out one another. No increase in noise will be experienced because the harmonics and the lowest frequency of noise from the inverter 10 and the motor 16 falls outside of the audible range (audible band).

Accordingly, the inverter 10 according to the first embodiment of the present invention includes the legs 11 controlled by PWM, and the inverter 10 is connected to the power supply via the common smoothing capacitor 13 on the input side and to the polyphase alternating current motor 16 on the output side. The PWM carrier signal is sent to the gate signal generator 12 independently provided for each of the legs 11, either for all of the legs 11 or for the legs connected to the same phase. Therefore, system costs can be prevented from increasing even if the number of the legs 11 increases.

Second Embodiment

Figure 4:
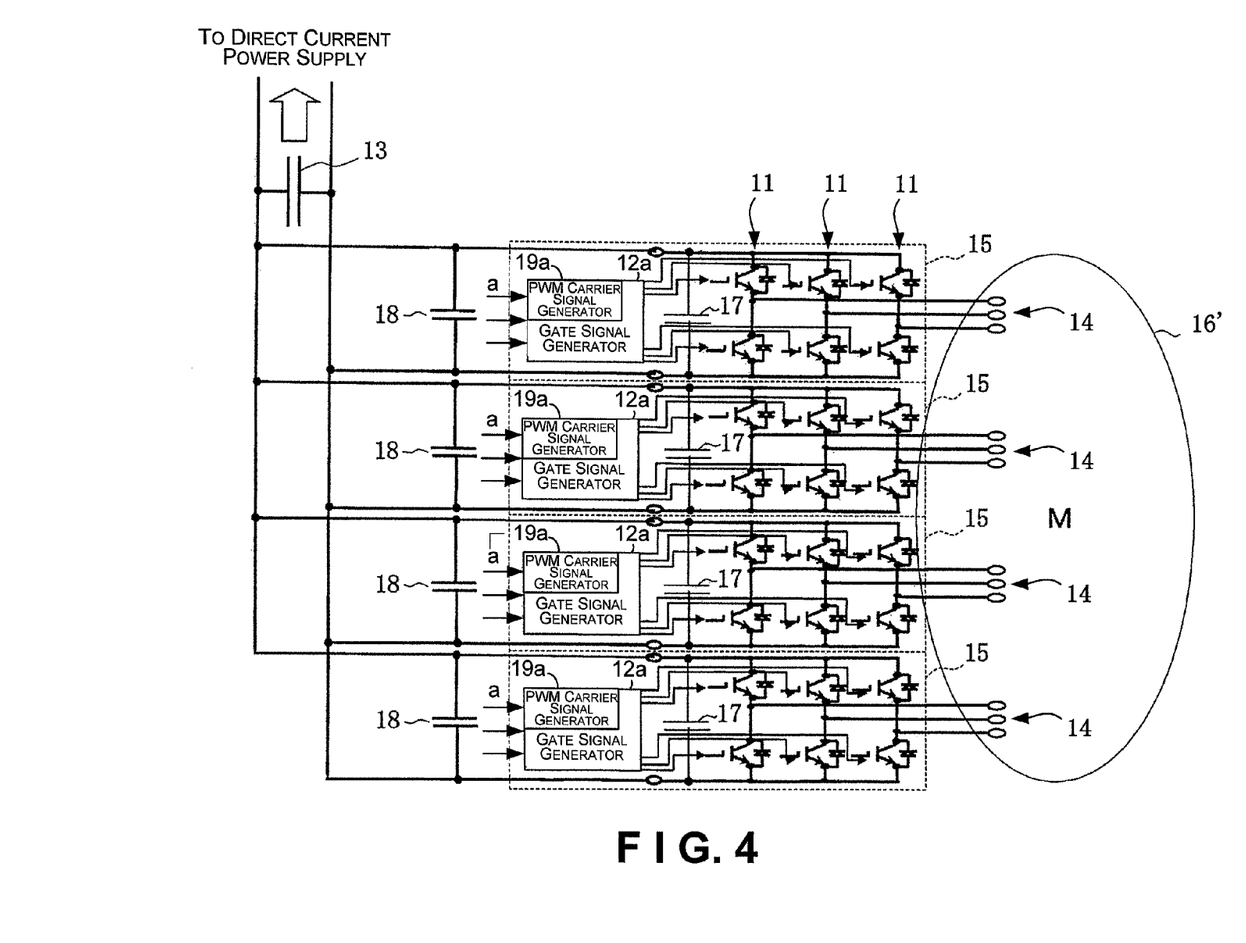
FIG. 4 is a block diagram of a power conversion apparatus in which a plurality of power conversion units are connected in parallel in accordance with a second embodiment of the present invention.

Referring now to FIG. 4, a power conversion apparatus in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

FIG. 4 is a block diagram of a power conversion apparatus (three-phase inverter) in which several power conversion units or three-phase inverters 15 are connected in parallel in accordance with the second embodiment of the present invention. In the example illustrated in FIG. 4, four of the inverters 15 are connected in parallel to form the power conversion apparatus of the second embodiment. Each of the inverters 15 includes a single gate signal generator 12a in which three of the gate signal generators 12 shown in FIG. 1 are integrated together. In the second embodiment, three slots are added to the number of the slots of the motor 16 in the first embodiment, and thus, individual windings are driven by individual legs with respect to a 12-slot three-phase alternating current motor 16'.

As shown in FIG. 4, each of the three-phase inverters 15 connected in parallel has an input side connected to a direct current power supply (not shown) via the smoothing capacitor 13 and an output side connected to the three-phase alternating current motor 16'. Each of the inverters 15 is provided with a snubber capacitor 17 and a preliminary smoothing capacitor 18. The number of connected three-phase inverters 15 is not limited to four, and can be any number greater than two. Moreover, the snubber capacitor 17 and the preliminary smoothing capacitor 18 attached to each inverter 15 may be omitted.

In the second embodiment, each set of three legs 11 shares the same gate signal generator 12a. The gate signal generator 12a is provided with a common carrier signal generators 19a, and configured to generate the phase on/off signals for three phases based on the input of the three-phase phase voltage command a.

In other words, in the second embodiment, the legs 11 that are connected to the U-phase, V-phase and W-phase coils share the single gate signal generator 12a. When a set of the legs 11 connected to the U-phase, V-phase and W-phase coils is defined as a leg group, there are four leg groups (first to fourth leg groups) provided in the power conversion apparatus in the second embodiment as shown in FIG. 4.

Among the three phases (U-phase, V-phase and W-phase) in the first leg group, the phase voltage command a of the U-phase differs from the phase voltage command a of the V-phase. Therefore, even when the three phases (U-phase, V-phase and W-phase) share the single carrier signal generator 19a, switch timing will not be synchronized between the three phases.

On the other hand, when the U-phase of the first leg group is compared with the U-phase of the second leg group, the carrier signals will differ because the U-phase of the first leg group is connected to a different one of the gate signal generators 12a from the gate signal generator 12a connected to the U-phase of the second leg group. Therefore, the switch timing of the U-phase of the first leg group will not be synchronized with that of the U-phase of the second leg group. The same relationship is established among the first through fourth leg groups with respect to each of the U-phase, V-phase and W-phase.

In the second embodiment, the legs 11 are provided respectively to the windings and the legs 11 of the U-phase, V-phase, and W-phase in the inverter 15 share the gate signal generator 12a so that the legs 11 of one leg group are driven by the common phase voltage command a. However, since the PWM carrier signals differ between the U-phase, V-phase and W-phase, even if the same phase voltage command value a is received to drive the legs 11 of on leg group, the switch operation timings of the legs 11 for the U-phase, V-phase and W-phase are not synchronized, and superimposition of the ripple currents can be circumvented.

Third Embodiment

Figure 5:
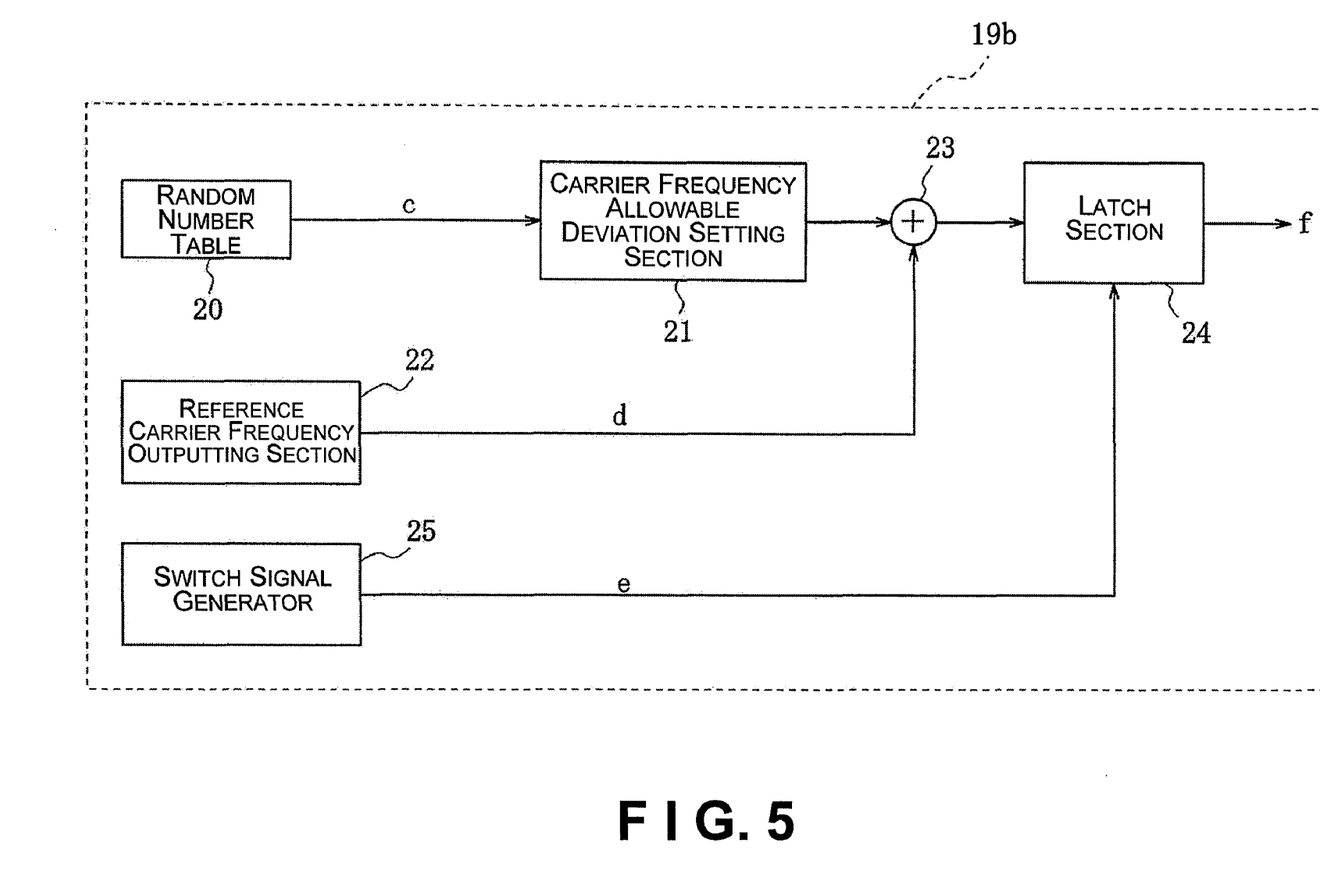
FIG. 5 is a block diagram of a gate signal generator of a power conversion apparatus in accordance with a third embodiment of the present invention.

Referring now to FIG. 5, a power conversion apparatus in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The power conversion apparatus of the third embodiment differs from the power conversion apparatus of the first and second embodiments in that a PWM carrier signal generator 19b is provided in place of the PWM carrier signal generator 19 of the first embodiment or the PWM carrier signal generator 19a of the second embodiment. FIG. 5 is a block diagram showing an example of the structure of the PWM carrier signal generator 19b in accordance with the third embodiment. Thus, the descriptions of the structures of the power conversion apparatus of the third embodiment that are identical to the first or second embodiment are omitted for the sake of brevity.

As shown in FIG. 5, the PWM carrier signal generator 19b includes a random number table 20, a carrier frequency allowable deviation setting section 21, a reference carrier frequency outputting section 22, an adder 23, a latch section 24, and a switch signal generator 25.

The random number table 20 is configured to generate a random signal c having a value in the range of −0.5 to +0.5. The generated random signal is input into the carrier frequency allowable deviation setting section 21. The carrier frequency allowable deviation setting section 21 is configured to set an allowable deviation for the carrier frequency based on the random signal c. The resulting allowable deviation obtained in the carrier frequency allowable deviation setting section 21 is added by the adder 23 to a reference carrier frequency d output from the reference carrier frequency output unit 22. The allowable deviation is added to the reference carrier frequency d, the output signal from the adder 23 is latched in the latch section 24 until a switch signal e is inputted from the switch signal generator 25, and then outputted from the latch section 24 as an instant carrier frequency signal f. The switch signal generator 25 is configured to generate the switch signal e with at a prescribed frequency.

Thus, in the third embodiment of the present invention, the PWM carrier signal generator 19b is independently provided to each of the gate signal generator 12 (first embodiment) or 12a (second embodiment). Therefore, the frequency of the PWM carrier signal outputted to the leg 11 of each phase (FIG. 1) or the legs 11 of the leg group of the inverter 15 (FIG. 4) is changed randomly at prescribed intervals.

Accordingly, the carrier frequencies for the legs 11 (FIG. 1) or the inverters 15 (FIG. 4) have no correlation with one another by using the PWM carrier signal generator 19b of the third embodiment. Therefore, the frequencies of the ripple currents generated thereby are also noncorrelated. The ripple currents cancel out one another, and the capacity of the common smoothing capacitor 13 can be reduced. Furthermore, the capacity ripple currents caused by beats between carriers (caused by a difference in frequency of resonance of least common multiples), which might be generated when the PWM carrier frequencies are set so as not to overlap between the legs, disappear quickly. Therefore, the smoothing capacitor will not be subjected to overheating or the like. Additionally, carrier frequencies will not change for a fixed period of time, thereby eliminating any need to reconfigure current control attributes or the like that rely on the voltage output control periods.

Fourth Embodiment

Figure 6:
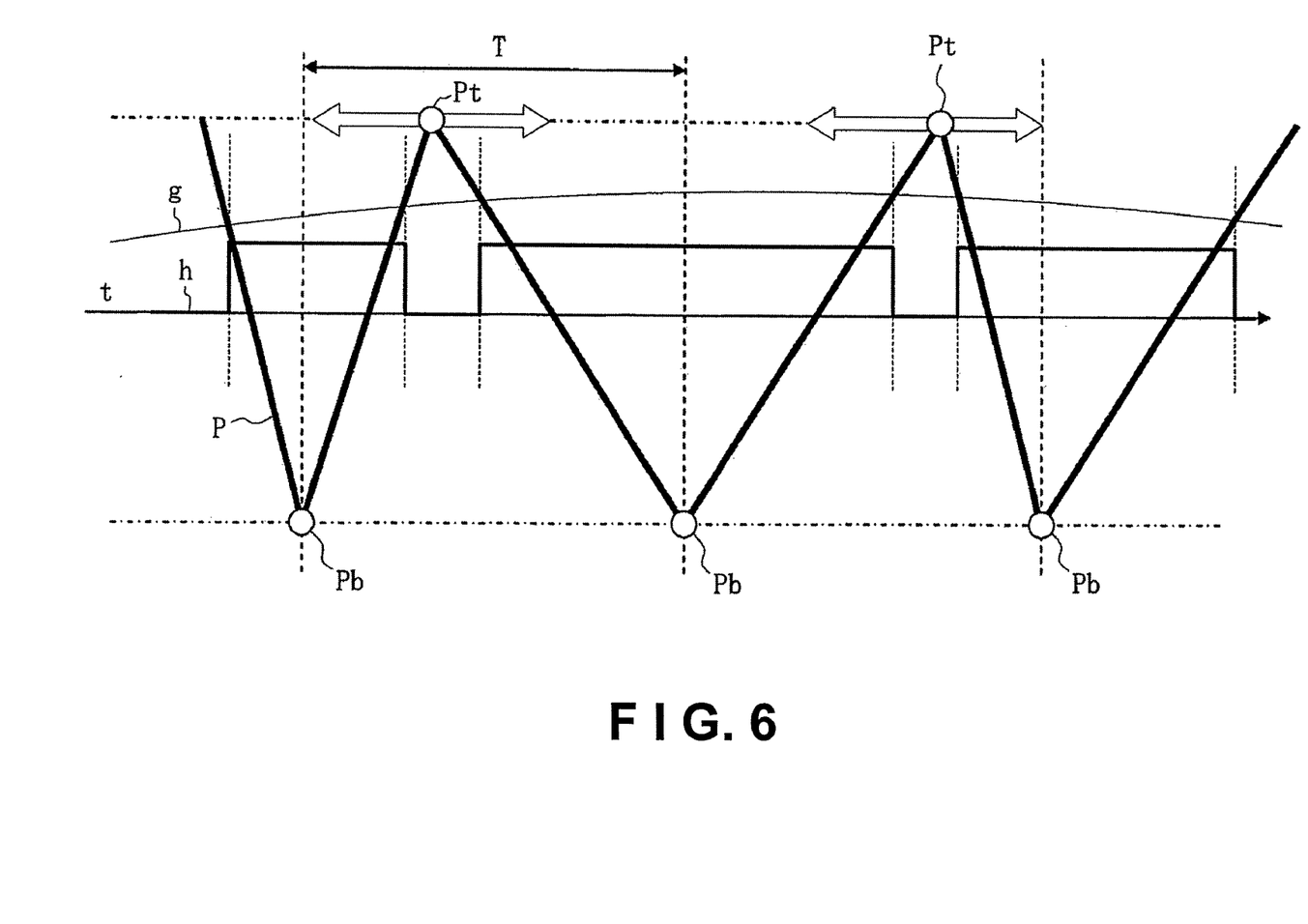
FIG. 6 is a waveform diagram showing a first example wherein a position of a peak in a PWM carrier triangular wave is changed in accordance with a fourth embodiment of the present invention.
Figure 7:
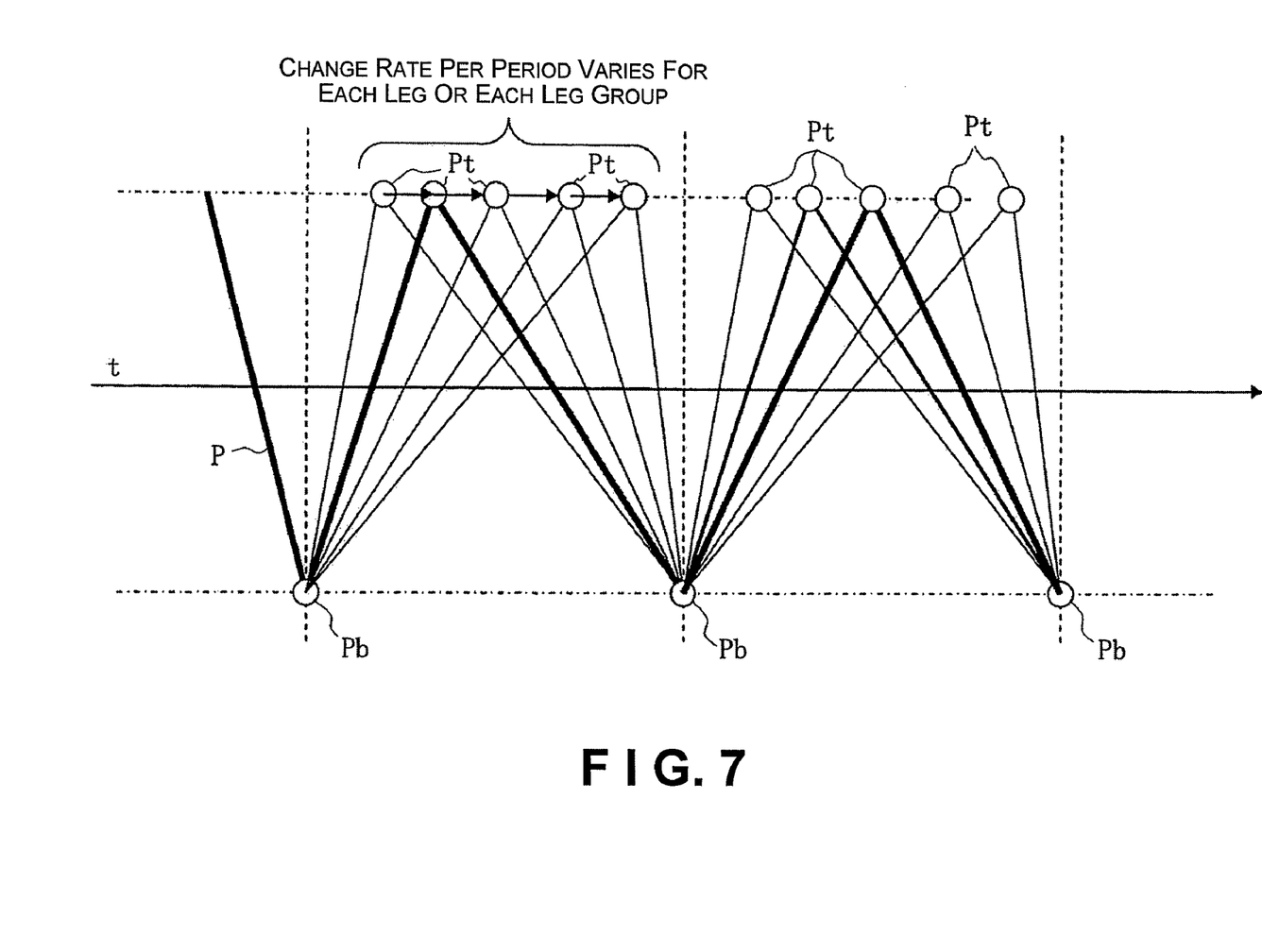
FIG. 7 is a waveform diagram showing a second example wherein the position of the peak in the PWM carrier triangular wave is changed in accordance with the fourth embodiment of the present invention.

Referring now to FIGS. 6 and 7, a power conversion apparatus in accordance with a fourth embodiment will now be explained. In view of the similarity between the first, second and fourth embodiments, the parts of the fourth embodiment that are identical to the parts of the first embodiment will be given the same reference numerals as the parts of the first or second embodiment. Moreover, the descriptions of the parts of the fourth embodiment that are identical to the parts of the first or second embodiment may be omitted for the sake of brevity.

The power conversion apparatus in accordance with the fourth embodiment of the present invention differs from the first or second embodiment in that, in the fourth embodiment, the PWM carrier signal generator 19 or 19a is arranged to selectively vary the positions (phases) of peaks or toughs of the PWM carrier triangular wave generated therewith. Thus, the descriptions of the structures of the power conversion apparatus of the fourth embodiment that are identical to the first, second or third embodiment are omitted for the sake of brevity.

FIGS. 6 and 7 show waveform diagrams showing first and second examples wherein a position of the peaks in the PWM carrier triangular wave is selectively changed in accordance with the fourth embodiment. As shown in FIGS. 6 and 7, the gate signal generator 12 or 12a (shown in FIGS. 3 and 4 of the first and second embodiments) provided with the PWM carrier signal generator 19 or 19a (shown in FIGS. 3 and 4 of the first and second embodiments) in the fourth embodiment is configured to be able to generate the PWM carrier signal triangular wave in which the positions of peaks or troughs (valleys) of the PWM carrier signal triangular wave are changed independently for each of the legs 11 or the leg group (shown in FIGS. 3 and 4 of the first and second embodiments).

According to the fourth embodiment, the phases of each leg 11 can be set noncorrelative among the legs 11 or the leg groups without changing the carrier frequencies, thereby eliminating a need to reconfigure current control attributes or the like that rely on the voltage output control period. Other advantages include the absence of instantaneous changes in control capabilities in each leg 11. The implementation of digital-type programs is facilitated as a result.

FIG. 6 is a waveform diagram showing the first example wherein the position of the peak Pt in the PWM carrier triangular wave is changed in an arbitrary manner or randomly. As shown in FIG. 6, for example, the position of the trough Pb of the PWM carrier triangular wave P (a comparative triangular wave used for creating a modified PWM carrier signal) is fixed, while the position of the peak Pt is changed to an arbitrary or random position (phase) between the previous and subsequent troughs (as indicated by the white arrows). In FIG. 6, the graph g indicates a phase voltage reference signal of the corresponding phase, and the graph h indicates the inverter high side gate signal.

In the fourth embodiment and referring to FIGS. 3 and 4 of the first and second embodiments, the variable PWM carrier signal generator (19 or 19a) provided to the gate signal generator (12 or 12a) is configured to be able to change the position (time or phase) of the peak of the PWM carrier triangular wave P, individually and arbitrarily within a period T (FIG. 6). Therefore, different peak and trough positions do not need to be set in advance for each leg 11 or each leg group. Thus, additional legs 11 can be easily added to the inverter if necessary.

FIG. 7 is a waveform diagram showing the second example wherein the position of the peak Pt in the PWM carrier triangular wave P is changed in an arbitrary manner or ramdomly. As shown in FIG. 7, for example, the position of the trough Pb of the PWM carrier triangular wave P is fixed, while the change rate v1, v2, v3, . . . (deg) of the position (phase) of the peak Pt is varied for each leg 11 (vn is the change rate of the n-th leg). For example, if the initial phase is set to x(0), the position (phase) of the peak of the i-th period becomes x(0)+ (i−1)v. In the event that the phase x exceeds 360°, the process restarts at x−360 degrees.

In other words, in the second example illustrated in FIG. 7, the gate signal generator (12 or 12a) is arranged as a variable PWM carrier signal generator block by arbitrarily and independently changing a change rate at which the positions of peaks or troughs of the PWM carrier signal triangular wave are altered for each period of the PWM carrier signal triangular wave. The change rate, i.e., the rate of movement of the peaks or troughs of the PWM carrier signal triangular wave for each period, is changed for each leg 11. The change rate varying operation is performed so that the same position (phase) will not be occupied within each period among the legs 11 or among the leg groups. Accordingly, a simpler method can be used to arbitrarily change the rate at which positions of peaks or troughs of the PWM carrier signal triangular wave are altered for each period.

Although in FIGS. 6 and 7, the examples in which the position of the peak Pt is changed while the position of the trough Pb is fixed were explained. However, it will be apparent to those skilled in the art from this disclosure that the position of the trough Pb can be changed or the positions of both the peak Pt and the trough Pb can be changed in order to carry out the power conversion apparatus in accordance with the fourth embodiment of the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A power conversion apparatus for converting direct current from a power source to polyphase alternating current, the power conversion apparatus comprising:
   a plurality of carrier signal generators configured and arranged to independently generate and transmit a plurality of carrier signals, respectively, the carrier signals having mutually different frequencies, with the carrier signal generators configured and arranged to set a lowest frequency of each of the carrier signals above an audible band;
   a plurality of gate signal generators operatively coupled to the carrier signal generators, respectively, to receive the carrier signals, each of the gate signal generators being configured and arranged to generate an on/off signal by comparing a command value of each phase of the polyphase alternating current and corresponding one of the carrier signals; and
   a plurality of legs connected to the gate signal generators, each of the legs being operated based on the on/off signal transmitted from corresponding one of the gate signal generators to convert the direct current to each phase of the polyphase alternating current.

2. The power conversion apparatus recited in claim 1, wherein
   the legs are grouped into a plurality of leg groups including the legs corresponding to each phase of the polyphase alternating current,
   each of the gate signal generators is respectively connected to each of the leg groups, and configured and arranged to compare the command value of each phase with corresponding one of the carrier signals to generate the on/off signal for corresponding one of the leg groups.

3. The power conversion apparatus recited in claim 1, wherein
   each of the carrier signal generators is configured and arranged to change a frequency of the carrier signal at prescribed intervals corresponding to a prescribed number of periods.

4. The power conversion apparatus recited in claim 1, wherein
   each of the carrier signal generators is configured and arranged to randomly change a frequency of the carrier signal at fixed intervals.

5. The power conversion apparatus recited in claim 1, wherein
   each of the carrier signal generators is configured and arranged to change a position of at least one of a peak and a trough of a carrier wave corresponding to the carrier signal.

6. The power conversion apparatus recited in claim 5, wherein
   each of the carrier signal generators is configured and arranged to change the position of at least one of the peak and the trough of the carrier wave within one period of the carrier wave.

7. The power conversion apparatus recited in claim 5, wherein
   each of the carrier signal generators is configured and arranged to vary a change rate at which the position of at least one of the peak and the trough of the carrier wave is changed within one period of the carrier wave.

8. A motor system comprising:
   an input pin connected to a direct current power source;
   a plurality of phase coils corresponding to each phase of a polyphase alternating current;
   a plurality of legs disposed between the input pin and the phase coils;
   a smoothing capacitor disposed between the input pin and the legs;
   a plurality of carrier signal generators configured and arranged to independently generate and transmit a plurality of carrier signals, respectively, the carrier signals having mutually different frequencies, with the carrier signal generators configured and arranged to set a lowest frequency of each of the carrier signals above an audible band; and
   a gate signal generator unit configured and arranged to generate and transmit an on/off signal obtained by comparing corresponding one of the carrier signals transmitted from the carrier signal generators and a command value of each phase of the polyphase alternating current.

9. The motor system recited in claim 8, wherein
   the phase coils are installed in parallel with respect to each phase of the polyphase alternating current, the legs are grouped into a plurality of leg groups including the legs corresponding to each phase of the polyphase alternating current, the gate signal generator unit includes a plurality of gate signal generators respectively connected to the leg groups, and each of the carrier signal generators is configured and arranged to independently generate and transmit the carrier signal to corresponding one of the gate signal generators.

10. The motor system recited in claim 8, further comprising a case that integrally holds the phase coils, the legs, the smoothing capacitor, the carrier signal generators and the gate signal generator unit.

11. The motor system recited in claim 10, wherein the phase coils are arranged as concentrated-winding coils, and each of the legs is respectively connected to each of the concentrated-winding coils.

12. A power conversion apparatus for converting direct current from a power source to polyphase alternating current, the power conversion apparatus comprising:

carrier signal generating means for independently generating and transmiting a plurality of carrier signals, the carrier signals having mutually different frequencies, with the carrier signal generating means configured and arranged to set a lowest frequency of each of the carrier signals above an audible band;

gate signal generating means for generating a plurality of on/off signals by comparing a command value of each phase of the polyphase alternating current and corresponding one of the carrier signals received from the carrier signal generating means; and switching means for converting the direct current to each phase of the polyphase alternating current based on the on/off signals transmitted from the gate signal generating means.

* * * * *